United States Patent Office 3,106,563
Patented Oct. 8, 1963

3,106,563
THIANTHRENE VAT DYESTUFFS
Wilhelm Schmidt-Nickels, Little York, N.J., assignor to General Aniline & Film Corporation, New York, N.Y., a corporation of Delaware
No Drawing. Filed Dec. 27, 1960, Ser. No. 78,275
5 Claims. (Cl. 260—316)

This invention relates to new vat dyestuffs containing thianthrene as part of the carbazole ring systems.

I have discovered that new thianthrene vat dyestuffs dyeing cotton from an alkaline hydrosulfite vat various shades of brown of good fastness properties are obtained by the condensation of 1 mole of dibromothianthrene prepared by bromination of thianthrene in nitrobenzene with 2 moles of either 1-amino-anthraquinone or its 4- or 5-benzoylamino substituted derivatives followed by a treatment of the resulting condensate with an acidic cyclizing agent such as anhydrous aluminum chloride. The condensate resulting from the reaction of 1 mole of dibromothianthrene with 2 moles of 1-aminoanthraquinone followed by cyclization may be further treated with a halogen such as chlorine, bromine or iodine in the conventional manner to give a halogen containing thianthrene vat dyestuff.

As a result of this condensation and cyclicizing reactions, I believe that the new vat dyestuffs have the following general formula:

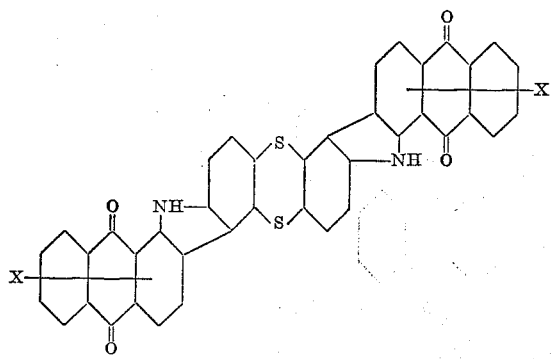

wherein X represents either hydrogen, a halogen such as bromine, chlorine or idone, or a benzoylamino group.

While I do not desire to limit the invention to a theoretical formula, it appears certain that the imide, —NH—, groups are linked to the thianthrene at the points which are occupied by the bromine atoms in dibromothianthrene. A possibility exists in that the carbazole ring systems can have their positions in such a way that the other ortho positions of the imide groups in the thianthrene ring system are engaged to form the carbazole ring systems as shown in the following general formula:

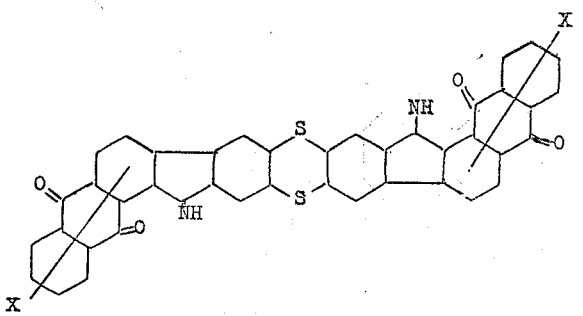

wherein X has the same values as above.

In preparing the new thianthrene vat dyestuffs of the present invention, I condense 1 mole of dibromothianthrene with 2 moles of either 1-aminoanthraquinone, 1-amino-4-benzoylamino-anthraquinone or 1-amino-5-benzoylanthraquinone in an organic solvent such as, for example, nitrobenzene, trichlorobenzene, chloronaphthalene, etc. at a temperature of from 100 to 220° C. in the presence of an acid binding agent such as sodium carbonate, potassium carbonate, sodium acetate, etc. and a copper catalyst such as copper powder, cuprous chloride, cupric chloride, copper acetate, etc. The condensation reaction is conducted by heating the reactants within the foregoing temperature range for a period of time of 8 to 25 hours. Thereafter, the condensation product is filtered off at room temperature, washed with nitrobenzene, benzene, ethyl alcohol and then finally with water until the filtrate is neutral and then dried.

To achieve cyclization of the foregoing condensation product, a melt of anhydrous aluminum chloride and sodium chloride is heated with the condensation products at temperatures of 80–200° C. under agitation for a period of time ranging from 5 to 30 minutes. The reaction mass is then introduced into ice water to which was added a little concentrated hydrochloric acid. After stirring for about 10 to 30 minutes, the cyclicized product is filtered off, washed neutral with water and dried.

Halogenated derivatives of the dyestuffs are obtained by treatment of the cyclization products with halogen such as bromine, chlorine or iodine in an organic solvent such as, for example, nitrobenzene, trichlorobenzene, dichlorobenzene and the like, or by other conventional means.

The invention will be further illustrated by way of the following examples:

Example I

To a suspension of 1 mole of thianthrene in nitrobenzene there were added slowly at room temperature 4.2 gram atoms of bromine diluted with some nitrobenzene. The bromination reaction was conducted at room temperature. Theory for dibromothianthrene, $C_{12}H_6Br_2S_2$, calls for 42.7% of Br. Chemical analysis of my product showed 43.2% Br.

A charge of 65 parts by volume of nitrobenzene, 5.3 parts by weight of dibromothianthrene (prepared as above), 6.4 parts by weight of 1-aminoanthraquinone, 3.0 parts by weight of anhydrous sodium carbonate and 0.9 part by weight of copper powder was agitated at 200–205° C. for 20 hours. The reaction product was filtered off at room temperature, washed with nitrobenzene, benzene, alcohol and then with water until neutral and finally dried. The product dyed cotton from an alkaline hydrosulfite vat only a faint tint of violet. The product has the probable structure:

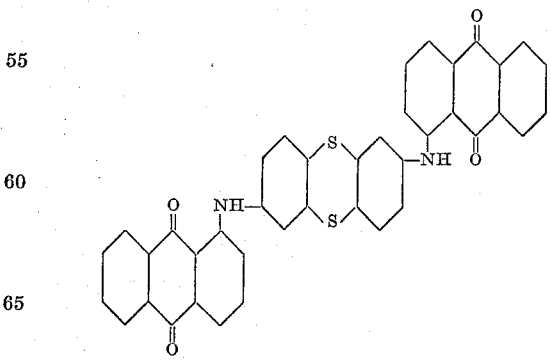

*Cyclization.*—A charge of 100 parts by weight of anhydrous aluminum chloride and 30 parts by weight of sodium chloride was heated under agitation to a melt of 170° C. At this temperature, 4 parts by weight of the above condensation reaction product was added to the melt. The charge was stirred at 173–180° C. for 25 minutes. The reaction mass was then introduced into 1000 parts of ice and water and 20 parts by volume of concentrated hydrochloric acid.

After stirring for about 15 minutes, the cyclicized product was filtered off, washed neutral and dried. The compound has the probable structure:

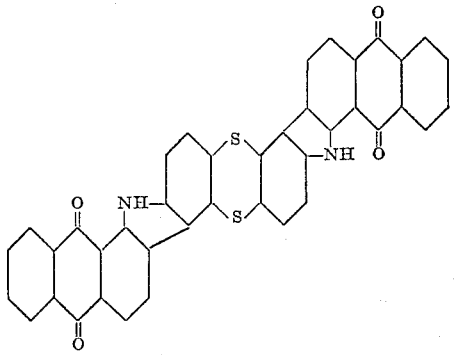

$C_{40}H_{18}N_2O_4S_2$: Mol. wt.=654. Found: S=9.82%, N=4.18%. Theory for $C_{40}H_{18}N_2O_4S_2$: S=9.79%, N=4.28%.

The new product dyes cotton from an alkaline hydrosulfite vat a strong brown of good washing, chlorine and light fastness.

*Example II*

A charge of 170 parts by volume of nitrobenzene, 10.7 parts by weight of dibromothianthrene, 19.6 parts by weight of 1 - amino-5-benzoylaminoanthraquinone, 6.1 parts by weight of anhydrous sodium carbonate and 1.8 parts by weight of copper powder was agitated at 200–205° C. for 25 hours. The reaction product was isolated as described in Example I. It has the probable structure:

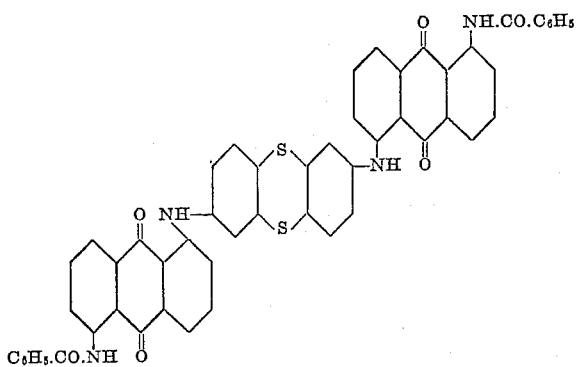

The product gave on cotton from an alkaline hydrosulfite vat only a weak violet dyeing.

*Cyclization.*—A charge of 200 parts by weight of anhydrous aluminum chloride and 60 parts by weight of sodium chloride was heated under agitation to a melt of 108° C. At this temperature, 8 parts by weight of the above reaction product was added to the melt over a period of 5 minutes without external heating to maintain a temperature range of 108–110° C. The cyclization reaction is exothermic. After all the product was introduced, the charge was stirred at 108–110° C. for an additional 15 minutes. The reaction mass was then introduced into 2000 parts of ice and water and 15 parts by volume of concentrated hydrochloric acid.

After stirring for about 15 minutes, the cyclicized product was filtered off, washed neutral and used as a dyestuff paste. The product dyed cotton from an alkaline hydrosulfite vat chocolate brown of good fastness properties particularly to chlorine and washing. A sample of the dyestuff paste was dried to determine the dyestuff content of the paste and to obtain material for analysis. It is believed that the dyestuff has the following formula:

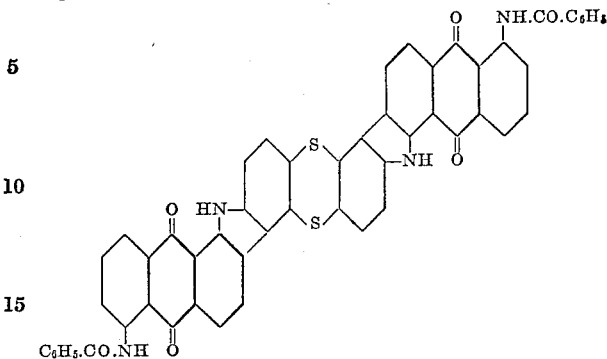

$C_{54}H_{28}N_4O_6S_2$: Mol. wt. 892. Found: S=7.1%, N=5.74%. Theory for $C_{54}H_{28}N_4O_6S_2$: S=7.17%, N=6.27%.

*Example III*

A charge of 85 parts by volume of nitrobenzene, 5.3 parts by weight of dibromothianthrene, 9.8 parts by weight of 1-amino-4-benzoylaminoanthraquinone, 3.0 parts by weight anhydrous sodium carbonate and 0.9 part by weight copper powder was agitated at 200–205° C. for 8 hours. The reaction product was isolated as described in Example I and has the probable structure:

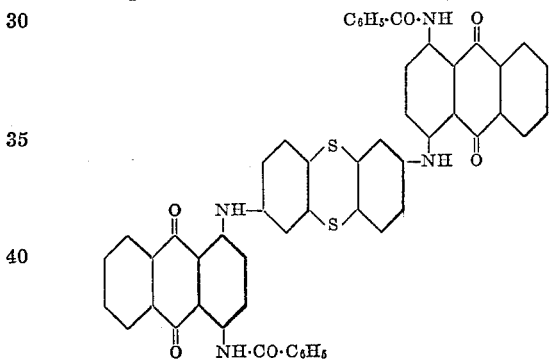

The product dyed cotton from an alkaline hydrosulfite vat only a rather weak blue-grey.

The cyclization was carried out under the same conditions as described in Example II. The product dyed cotton from an alkaline hydrosulfite vat maroon brown of good fastness properties, particularly to light and washing. It is believed that the new dyestuff has the structure:

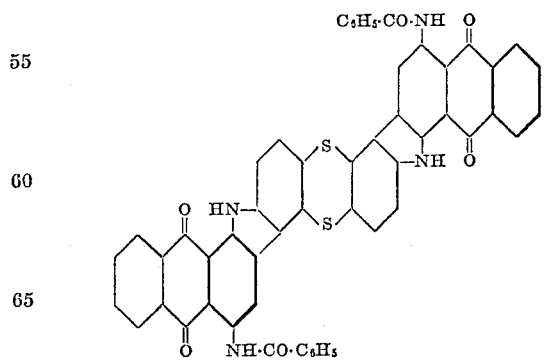

$C_{54}H_{28}N_4O_6S_2$: Mol. wt.=892. Found: S=7.0%. Theory for $C_{54}H_{28}N_4O_6S_2$: S=7.17%.

*Example IV*

A charge of 50 parts by volume of nitrobenzene, 5.0 parts by weight of the brown dyestuff $C_{40}H_{18}N_2O_4S_2$, obtained according to Example I, 0.3 part by weight of iodine and 1.6 parts by volume of bromine was agitated at room temperature for 15 hours. Then the temperature was raised to 90° C. and the charge was stirred at 90–93° C. for 2 hours. The brominated dyestuff was filtered off at room temperature, washed with nitrobenzene, benzene, alcohol, water until neutral and used for dyeing as a paste. The product dyed cotton from an alkaline hydrosulfite vat bright reddish brown of good fastness properties particularly to chlorine and washing. A dried sample of the dyestuff contained 12.5% bromine.

I claim:

1. A thianthrene vat dyestuff obtained by the process which comprises condensing 1 mole of dibromothianthrene with 2 moles of an anthraquinone selected from the class consisting of 1-amino-anthraquinone, 1-amino-4-benzoylaminoanthraquinone and 1-amino-5-benzoylaminoanthraquinone at a temperature of 100°–220° C. in the presence of an acid binding agent selected from the class consisting of sodium carbonate, potassium carbonate and sodium acetate and a copper catalyst in an inert solvent diluent followed by the cyclization of the resulting condensate with an acidic cyclicizing agent consisting of a melt of anhydrous aluminum chloride and sodium chloride at a temperature of 80°–200° C.

2. A thianthrene vat dyestuff prepared according to the process of claim 1 wherein the aminoanthraquinone is 1-amino-anthraquinone.

3. The thianthrene vat dyestuff prepared according to the process of claim 1 wherein the aminoanthraquinone is 1-amino-4-benzoylaminoanthraquinone.

4. The thianthrene vat dyestuff prepared according to the process of claim 1 wherein the aminoanthraquinone is 1-amino-5-benzoylaminoanthraquinone.

5. The thianthrene vat dyestuff prepared according to the process of claim 1 wherein the cyclicized vat dyestuff is halogenated with a halogen selected from the class consisting of bromine, chlorine and iodine at a temperature of from room temperature to 93° C.

No references cited.